US011313968B2

(12) United States Patent
Farris (10) Patent No.: US 11,313,968 B2
(45) Date of Patent: Apr. 26, 2022

(54) INTERFERENCE SIGNAL REJECTION IN LIDAR SYSTEMS

(71) Applicant: Texas Instruments Incorporated, Dallas, TX (US)

(72) Inventor: Jeffrey Scott Farris, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 635 days.

(21) Appl. No.: 16/221,301

(22) Filed: Dec. 14, 2018

(65) Prior Publication Data

US 2020/0191962 A1     Jun. 18, 2020

(51) Int. Cl.
  *G01S 17/10*  (2020.01)
  *G01S 7/481*  (2006.01)
  *G01S 7/484*  (2006.01)
  *G01S 17/26*  (2020.01)

(52) U.S. Cl.
  CPC .............. *G01S 17/26* (2020.01); *G01S 7/484* (2013.01); *G01S 7/4814* (2013.01); *G01S 7/4816* (2013.01); *G01S 7/4817* (2013.01)

(58) Field of Classification Search
  CPC ........ G01S 17/26; G01S 17/894; G01S 17/10; G01S 7/4814; G01S 7/484; G01S 7/4876; G01S 7/4817; G01S 7/4816
  See application file for complete search history.

(56) References Cited

U.S. PATENT DOCUMENTS

| 2012/0038817 | A1* | 2/2012 | McMackin | H04N 5/2354 348/345 |
| 2015/0051498 | A1* | 2/2015 | Darty | G16H 50/50 600/477 |
| 2015/0378023 | A1* | 12/2015 | Royo Royo | G01S 17/32 356/5.01 |
| 2017/0003392 | A1* | 1/2017 | Bartlett | G01S 7/4814 |
| 2017/0357000 | A1 | 12/2017 | Bartlett et al. | |
| 2018/0031676 | A1* | 2/2018 | Sadhu | G01S 7/484 |
| 2018/0113200 | A1* | 4/2018 | Steinberg | G01S 17/93 |
| 2018/0284241 | A1* | 10/2018 | Campbell | G01S 7/4865 |
| 2018/0341020 | A1* | 11/2018 | Magee | G01S 7/4863 |

* cited by examiner

*Primary Examiner* — Sang H Nguyen
(74) *Attorney, Agent, or Firm* — Michelle F. Murray; Charles A. Brill; Frank D. Cimino (57) ABSTRACT

In described examples, a LIDAR system includes a laser transmitter, a receiver, and first and second light directing elements. The laser transmitter is configured to scan a field of view with a laser beam. The receiver is configured to receive light from the field of view, and to focus a first portion of the received light, corresponding to a region of interest, on a first light directing element. The receiver is also configured to focus a second portion of the received light, corresponding to the field of view except for the region of interest, on multiple second light directing elements. The first light directing element is configured to direct the first portion of the received light towards a first photon detector, and the second light directing elements are configured to direct the second portion of the received light towards a second photon detector.

19 Claims, 7 Drawing Sheets

INTERFERENCE SIGNAL REJECTION IN LIDAR SYSTEMS

BACKGROUND

This application relates generally to LIDAR systems, and more particularly to filtering interfering signals from a LIDAR return signal.

Figure 1:
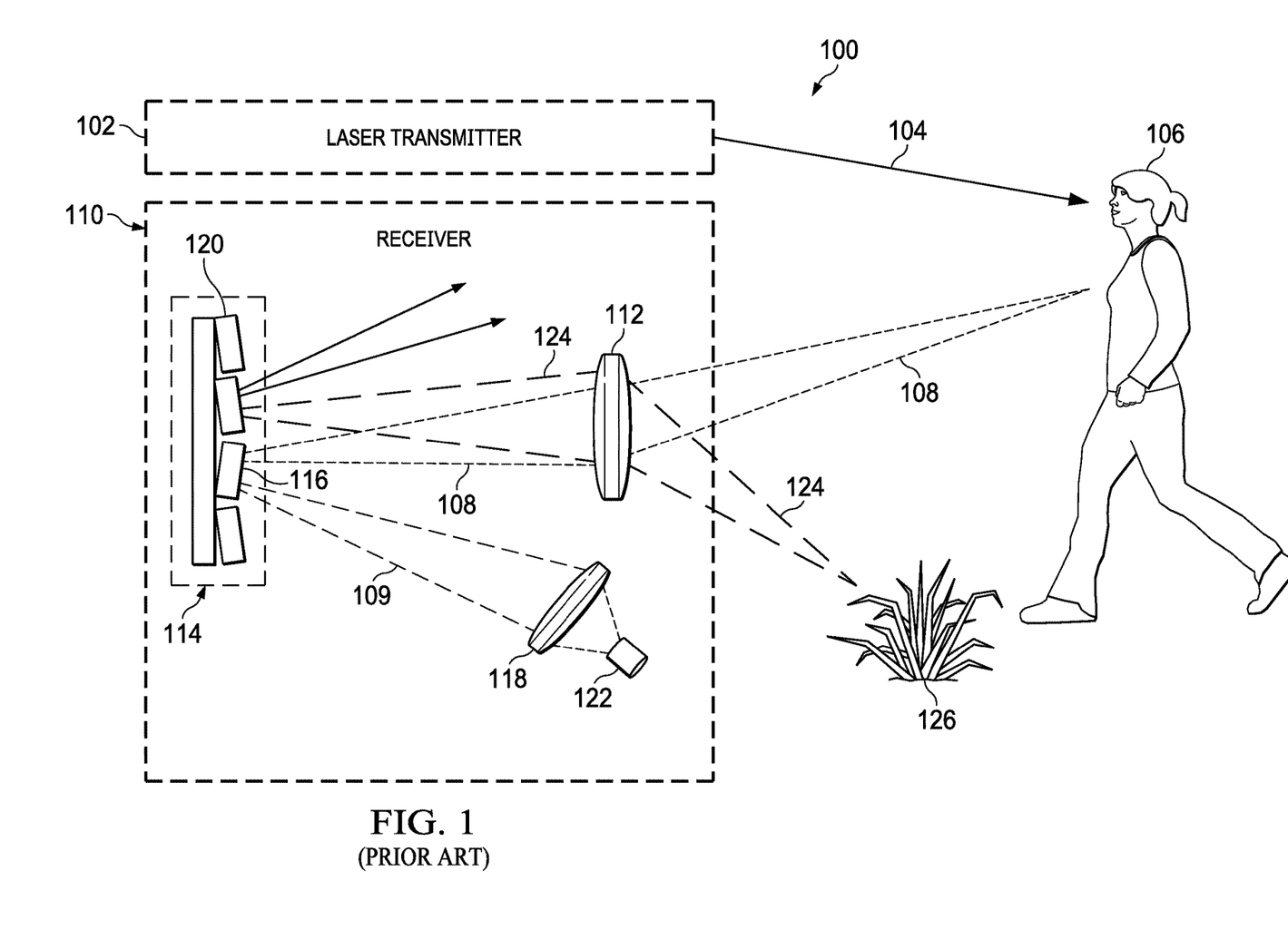
FIG. 1 schematically shows an example of a prior art LIDAR system for filtering interfering signals from a LIDAR return signal.

FIG. 1 schematically shows an example of a prior art LIDAR system 100 for filtering interfering signals 124 from a LIDAR return signal. "LIDAR" (also called LiDAR and LADAR) is a portmanteau of laser and radar. LIDAR combines laser-focused projection and imaging with the ability to calculate distances by measuring the time for a signal to return, where such light is inside or within a field of view (FOV) of the system 100. By contrast, an interfering signal is light originating outside a LIDAR instantaneous field of view 204 (IFOV), as described in detail below and with respect to FIG. 2.

In the LIDAR system 100, a laser transmitter 102 emits a laser beam 104, and uses the laser beam 104 to scan a deflection region with a specified shape using a specified scanning pattern, the specified shape and scanning pattern typically being pre-defined using software. The emitted laser beam 104 is typically an infrared laser beam 104, such as a 905 nanometer (nm) or 1550 nm wavelength laser, and is typically pulsed, so that a high powered laser beam 104 is emitted in a brief pulse every few microseconds. For example, a 75 Watt laser beam 104 can be emitted in 5 nanosecond pulses to produce a high peak energy, and a low average energy.

As shown in FIG. 1, the laser beam 104 encounters and illuminates a target object 106. A target object 106 can be an object incidentally located within the laser transmitter's 102 deflection region, or deliberately scanned by the laser transmitter 102. The light from the laser beam 104 is scattered by the target object 106 (generally, a target object 106 is anything which scatters the laser beam 104). A portion of the laser beam 104 light scattered by the target object 106 is scattered light 108, which is laser beam 104 light scattered in the direction of a receiver 110 so that a receiver lens system 112 in the receiver 110 will receive the scattered light 108 and focus it on an array of micromirrors 114 in a digital micromirror device (a DMD, not shown). Such DMDs are commercially available from Texas Instruments Incorporated. FIG. 1 is further described below in light of FIG. 2, which is used to describe the field of view 202 and instantaneous field of view 204 of the LIDAR system 100.

Figure 2:
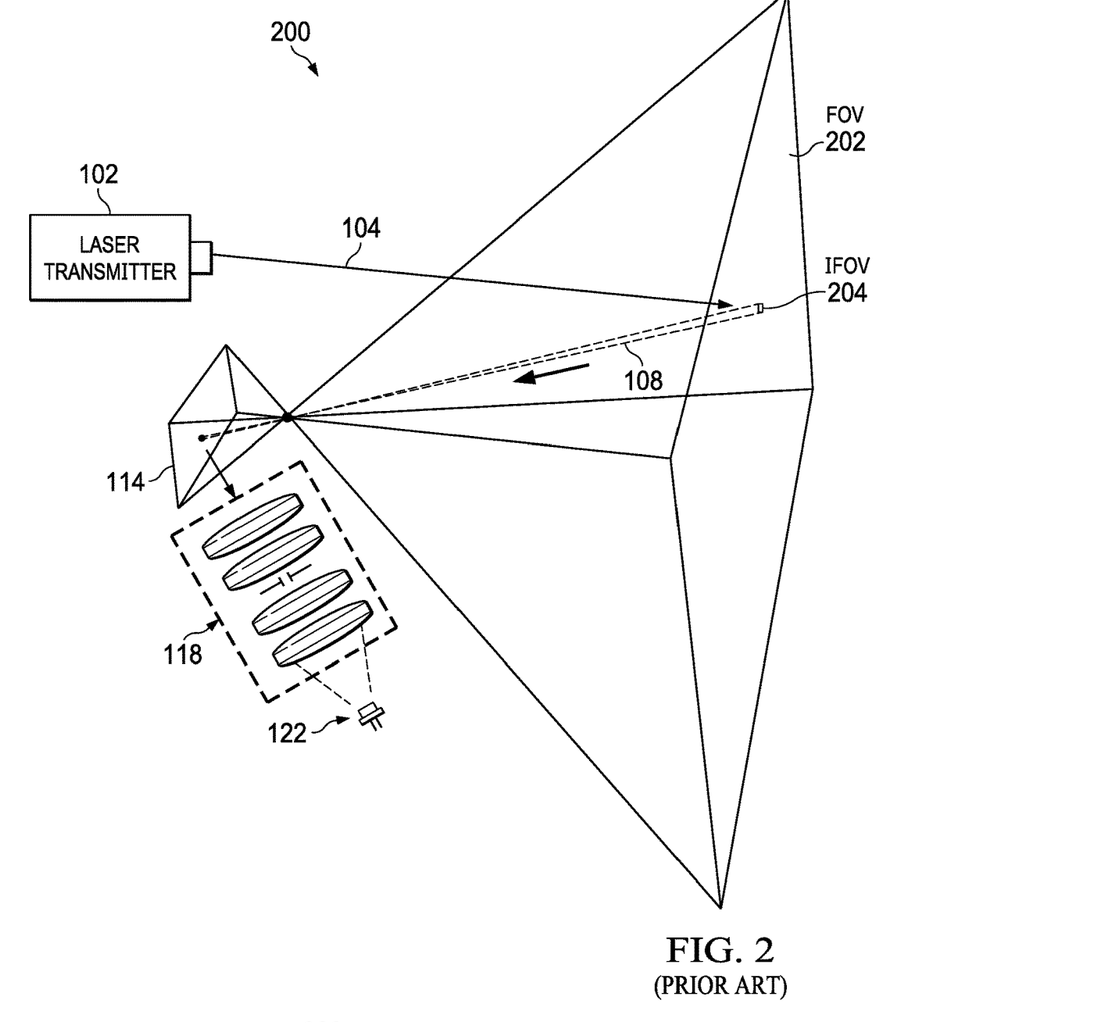
FIG. 2 schematically shows a prior art example of a field of view of a LIDAR system.

FIG. 2 schematically shows a prior art example 200 of a field of view (FOV) 202 of a LIDAR system 100 (not shown). A laser transmitter 102 of the LIDAR system 100 emits a laser beam 104. The shape of the region to which the laser beam 104 can be deflected by the laser transmitter 102 is generally conical or pyramidal in shape, and typically is software-controlled. The receiver lens system 112 (see FIG. 1) is able to receive light, including the scattered light 108, from a frustum-shaped region called the field of view 202, or FOV 202, of the LIDAR system 100.

As shown in FIG. 1, at one time, one mirror (or more) in the array 114 is angled in a direction other than the remaining mirrors in array 114, with the singular mirror so angled referred to herein as an activated mirror 116 (or activated micromirror 116) and the remaining mirrors referred to as deactivated mirrors 120 (or deactivated micromirrors 120). The activated mirror 116 reflects light it receives towards and through a detector lens system 118, to a photon detector 122. Deactivated mirrors 120 are angled to reflect light away from the detector lens system 118. Activated and deactivated micromirrors are further described with respect to FIG. 6.

In FIG. 2, the region within the FOV 202 from which the activated mirror 114 can receive light is called the instantaneous field of view 204, or IFOV 204. The IFOV 204 is analogous to a "pixel" within the FOV 202, much as the activated mirror 116 is analogous to a "pixel" within the micromirror array 114. Different micromirrors in the micromirror array 114 are activated and deactivated at different times to change the IFOV 204. The activated mirror 116 is selected to receive at least some—preferably, all—of the scattered light 108. (In some embodiments, multiple activated mirrors 116 are used.) That is, the activated mirror 116 is selected to track the location of the source of the scattered light 108 within the FOV 202, so that the frustum of the IFOV 204 contains the source of the scattered light 108, and the scattered light 108 is received and reflected by the activated mirror 116 to (ultimately) the photon detector 122. This overlap is assumed by FIG. 2, in which the scattered light 108 is shown as contained within the IFOV 204 frustum. The source of the scattered light 108 is the intersection of the laser beam 104 with the target object 106. Tracking is generally performed using software.

FOV light is defined herein as light received from within the FOV 202. Non-IFOV light is defined herein as light received from within the FOV 202 but not within the IFOV 204. IFOV light is defined herein as light received from within the IFOV 204. Accordingly, the activated mirror 116 is used to select IFOV light from FOV light, and thereby to isolate that selected IFOV light from non-IFOV light.

In FIG. 1, the IFOV light reflected by the activated mirror 116 is shown as reflected light 109, corresponding to an IFOV (see, e.g., IFOV 204 of FIG. 2) of the LIDAR system 100. The reflected light 109 is focused by the detector lens system 118 into the photon detector 122, which can be, for example, a photodiode. Non-IFOV light 124 is light emitted from or scattered by light sources outside the IFOV 204, referred to herein as interfering sources 126. Non-IFOV light 124 is focused by the receiver lens system 112 on some or all of the deactivated mirrors 118, resulting in the non-IFOV light 124 being scattered away from the detector lens system 118 and not detected by the photon detector 122. The receiver 110 preferably encloses the micromirror array 114, the detector lens system 118, and the detector 122, isolating them from light not passed by the receiver lens system 112.

A LIDAR system for filtering interfering signals from a LIDAR return signal is disclosed by U.S. Pat. Pub. No. 20170357000, which is incorporated herein by reference.

Figure 3:
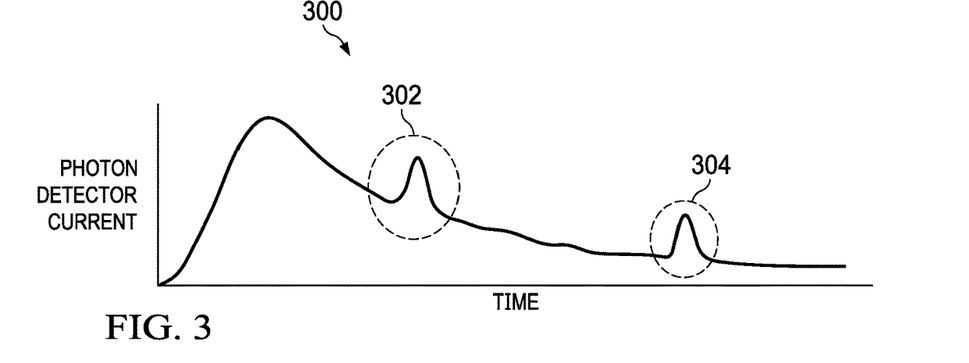
FIG. 3 shows an example prior art graph of photon detector current against time.

FIG. 3 shows an example prior art graph 300 of photon detector 122 current against time. The greater the time, the greater the distance of a detected object from the LIDAR system 100. The greater the current, the stronger the returning light signal from the detected object. As shown in FIG. 3, interfering signals 302, corresponding to light signals from interfering sources 126, can be mixed in the time domain with true return signals 304, corresponding to light received from within the IFOV 204 of the LIDAR system 100. That is, signals not received from within the IFOV 204 can be detected as if they were within the IFOV 204 and closer to (or further from) the LIDAR system 100 than the target object 106. Accordingly, a LIDAR system 300 can experience false positive object detection. This can occur as a result of, for example, imperfect spatial light filtering by a micromirror array 114 as further described with respect to FIG. 4.

Figure 4:
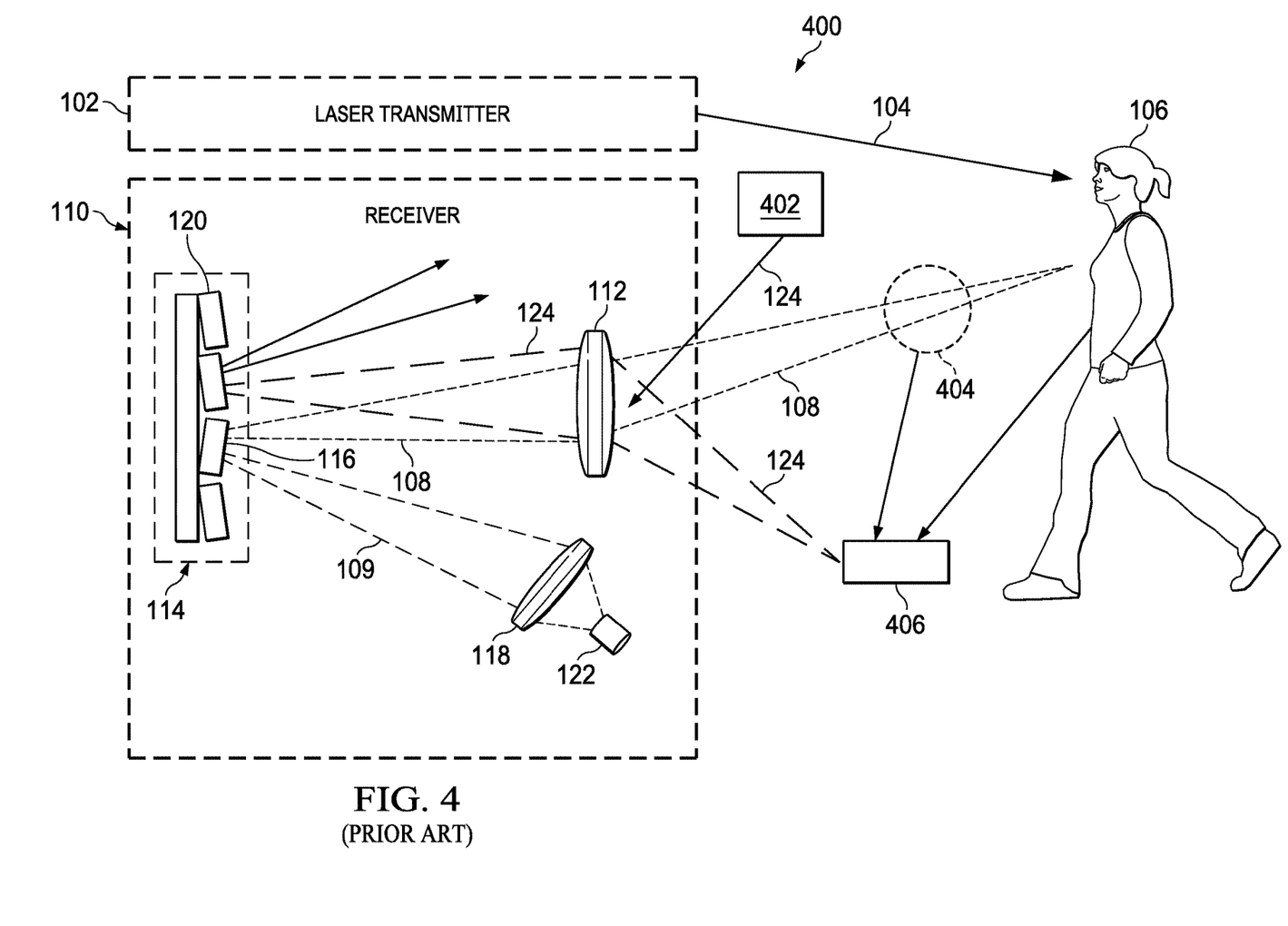
FIG. 4 schematically shows an example of a prior art LIDAR system for filtering interfering signals from a LIDAR return signal.

FIG. 4 schematically shows an example of a prior art LIDAR system 400 for filtering interfering signals 124 from a LIDAR return signal. As shown in FIG. 4, in practice, micromirrors in the micromirror array 114 are not perfect spatial light filters. That is, some non-IFOV light 124 (light received from a source within the FOV 202, but outside the IFOV 204) will generally be received and detected by the photon detector 122 as if it were IFOV light (light received from a source within the IFOV 204). Accordingly, for example, some non-IFOV light 124 may be reflected by deactivated micromirrors 120 in the micromirror array 114 towards, rather than away from, the detector lens system 118 (or non-IFOV light 124 may be otherwise reflected, refracted, or scattered towards the detector lens system 118). This light will then be detected by the detector 122. Also, some IFOV light will be reflected by the activated micromirror 116 away from the detector lens system 118 (or IFOV light may be otherwise reflected, refracted, or scattered away from the detector lens system 118). The ratio of light received by the photon detector 122 which is received from within the IFOV 204 (IFOV light), to light which is received from within the FOV 202 but outside the IFOV 204 (non-IFOV light), is the contrast ratio of the photon detector 122.

Non-IFOV light 124 can comprise, for example: light from a pulsed light source 402 other than the LIDAR system's 400 laser transmitter 102, for example, from an autonomous vehicle or a from a malicious actor with a pulsed laser light source; light scattered from the target object 106 within the IFOV 204, which is then deflected (for example, scattered by particulates 404) towards a reflective object 406, which reflects the light towards the receiver lens system 112; or light scattered from the target object 106 towards the reflective object 406 (outside the IFOV 204), which reflects the scattered light towards the receiver lens system 112.

SUMMARY

In described examples, a LIDAR system includes a laser transmitter, a receiver, and first and second light directing elements. The laser transmitter is configured to scan a field of view with a laser beam. The receiver is configured to receive light from the field of view, and to focus a first portion of the received light, corresponding to a region of interest, on a first light directing element. The receiver is also configured to focus a second portion of the received light, corresponding to the field of view except for the region of interest, on multiple second light directing elements. The first light directing element is configured to direct the first portion of the received light towards a first photon detector, and the second light directing elements are configured to direct the second portion of the received light towards a second photon detector.

DETAILED DESCRIPTION

Figure 5:
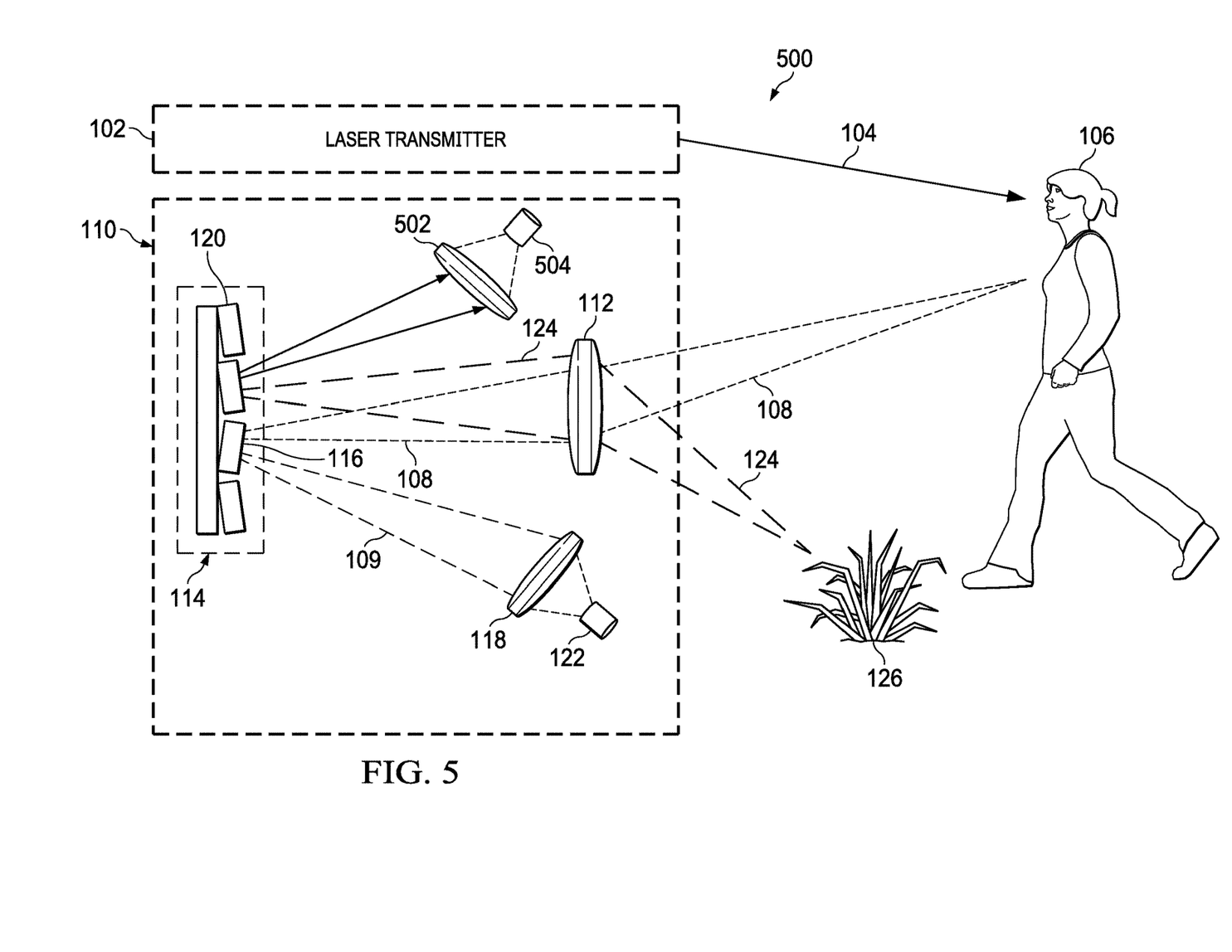
FIG. 5 shows an example of a LIDAR system for filtering interfering signals from a LIDAR return signal, using two photon detectors.

FIG. 5 shows an example of a LIDAR system 500 for filtering interfering signals 124 from a LIDAR return signal, using two photon detectors 122, 504. The LIDAR system 500 of FIG. 5 shares various aspects with the LIDAR system 100 of FIG. 1, so like reference numbers from FIGS. 1 through 4 are carried forward into FIGS. 5 through 8 for such items, but without prejudice or admission.

As shown in FIG. 5, a LIDAR system 500 includes a laser transmitter 102 which emits a laser beam 104, and a receiver 110. The receiver 110 includes a receiver lens system 112, a DMD including a micromirror array 114, a first detector lens system 118 which focuses light reflected from an activated mirror 116 in the micromirror array 114 on a first photon detector 122, and a second detector lens system 502 which focuses light reflected from deactivated mirrors 120 in the micromirror array 114 on a second photon detector 504.

The laser beam 104 encounters and illuminates a target object 106 while the laser beam 104 is scanned across the laser transmitter's 102 FOV 202. Some of the light of the laser beam 104 is scattered by the target object 106 towards the IFOV 204 of the LIDAR system 500, and is received by the receiver lens system 110 and focused on the activated mirror 116 (or multiple activated micromirrors 116) corresponding to that IFOV 204. This IFOV light is reflected by the activated mirror 116 towards the first detector lens system 118, which focuses the IFOV light on the first photon detector 122. A (preferably, much) smaller fractional portion of the IFOV light is received by the second detector lens system 502, which focuses the IFOV light on the second photon detector 504.

The receiver lens system 110 also receives non-IFOV light 124, and focuses the non-IFOV light 124 on the deactivated mirrors 120. That is, non-IFOV light 124 generally does not enter the receiver lens system 110 from the appropriate angle to be focused by the receiver lens system 110 on the activated mirror 116. The non-IFOV light 124 is reflected by the deactivated mirrors 120 towards the second detector lens system 502, which focuses the non-IFOV light 124 on the second photon detector 504. A (preferably, much) smaller fractional portion of the non-IFOV light 124 is received by the first detector lens system 118, which focuses the non-IFOV light 124 on the first photon detector 122.

The ratio of light received by the first photon detector 122 which originates within the IFOV 204 (IFOV light), to light which originates within the FOV 202 but outside the IFOV 204 (non-IFOV light 124), is the contrast ratio of the first photon detector 122, and is referred to herein as the activated-state contrast ratio. The ratio of light received by the second photon detector 504 which originates within the FOV 202 but outside the IFOV 204 (non-IFOV light 124), to light which originates within the IFOV 204 (IFOV light), is the contrast ratio of the second photon detector 504, and is referred to herein as the deactivated-state contrast ratio.

By directing light within the IFOV 204 primarily to the first photon detector 122, and simultaneously directing light within the FOV 202 but outside the IFOV 204 primarily to the second photon detector 504, the LIDAR system 500 can analyze (e.g., compare) the resulting signals to determine which (if any) return signals correspond to false positives. This can be done by, for example, normalizing the second photon detector 504 output to the activated-state contrast ratio, such as by dividing the second photon detector 504 output by a factor proportional to the deactivated-state contrast ratio (gain≈1/deactivated-state contrast ratio). A differential between the output of the first photon detector 122 and the normalized output of the second photon detector 504 will then result in false positive signals being subtracted out, leaving true return signals. Alternatively, the second photon detector 504 can be normalized to the activated-state contrast ratio, by multiplying the second photon detector 504 output by a factor proportional to the activated-state contrast ratio (gain≈activated-state contrast ratio). A differential between the output of the first photon detector 122 and the normalized output of the second photon detector 504 will then result in true return signals being subtracted out, leaving false positive results which can be selectively ignored in the output of the first photon detector 122.

Return signals can also be analyzed to determine which (if any) return signals correspond to false positives by comparing magnitudes of return signals as output by the first photon detector 122 to magnitudes of return signals as output by the second photon detector 504. Generally, if the magnitude of a return signal (pulse) received at the same point in time by both detectors 122, 504 is greater in the first photon detector 122 output than in the second photon detector output 504, the return signal can be classified as originating within the IFOV 204. Similarly, if the magnitude of a return signal received at the same point in time by both detectors 122, 504 is greater in the second photon detector 504 output than in the first photon detector output 122, the return signal can be classified as an interfering signal 124 originating outside the IFOV 204 (a false positive signal). In this manner, a differential comparison can be used to avoid the effect of contrast ratio on the results of detection.

Figure 6:
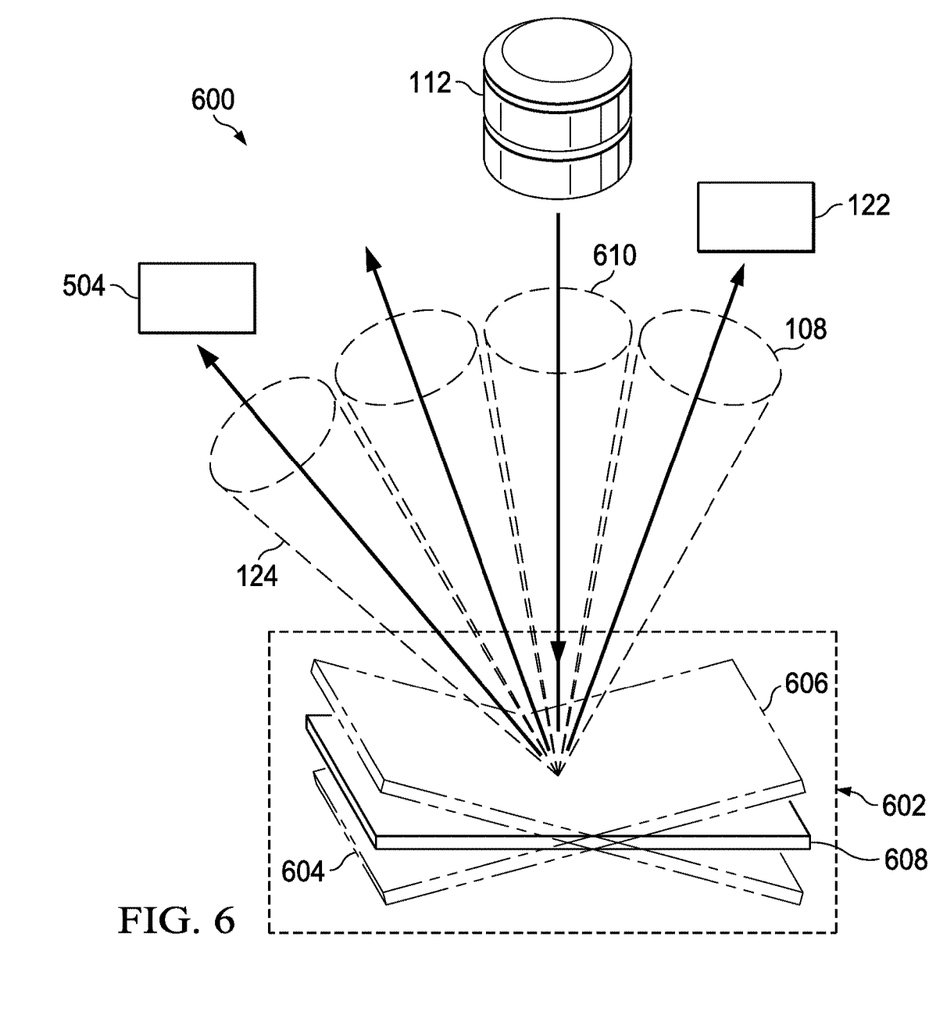
FIG. 6 diagrammatically shows an example of reflection of light by a micromirror in the LIDAR system of FIG. 5.

FIG. 6 diagrammatically shows an example 600 of reflection of light by a micromirror 602 in the LIDAR system 500 of FIG. 5. The micromirror 602 is in an "on" position 604 if activated, an "off" position 606 if deactivated, and in a "flat" position 608 if the micromirror array 114 (not shown) is powered down. The micromirror 602 receives light 610 from the receiver lens system 112, the received light 610 corresponding to a portion of the FOV 202 which is the IFOV 204 when the micromirror 602 is in an on position 604. When in an on position 604, the micromirror reflects IFOV light towards the first detector lens system 118 (see, FIG. 5), which focuses the reflected light 109 on the first photon detector 122. When in an off position 606, the micromirror 602 reflects non-IFOV light 124 towards the second detector lens system 502 (see, FIG. 5), which focuses the non-IFOV light 124 on the second photon detector 504.

Figure 7:
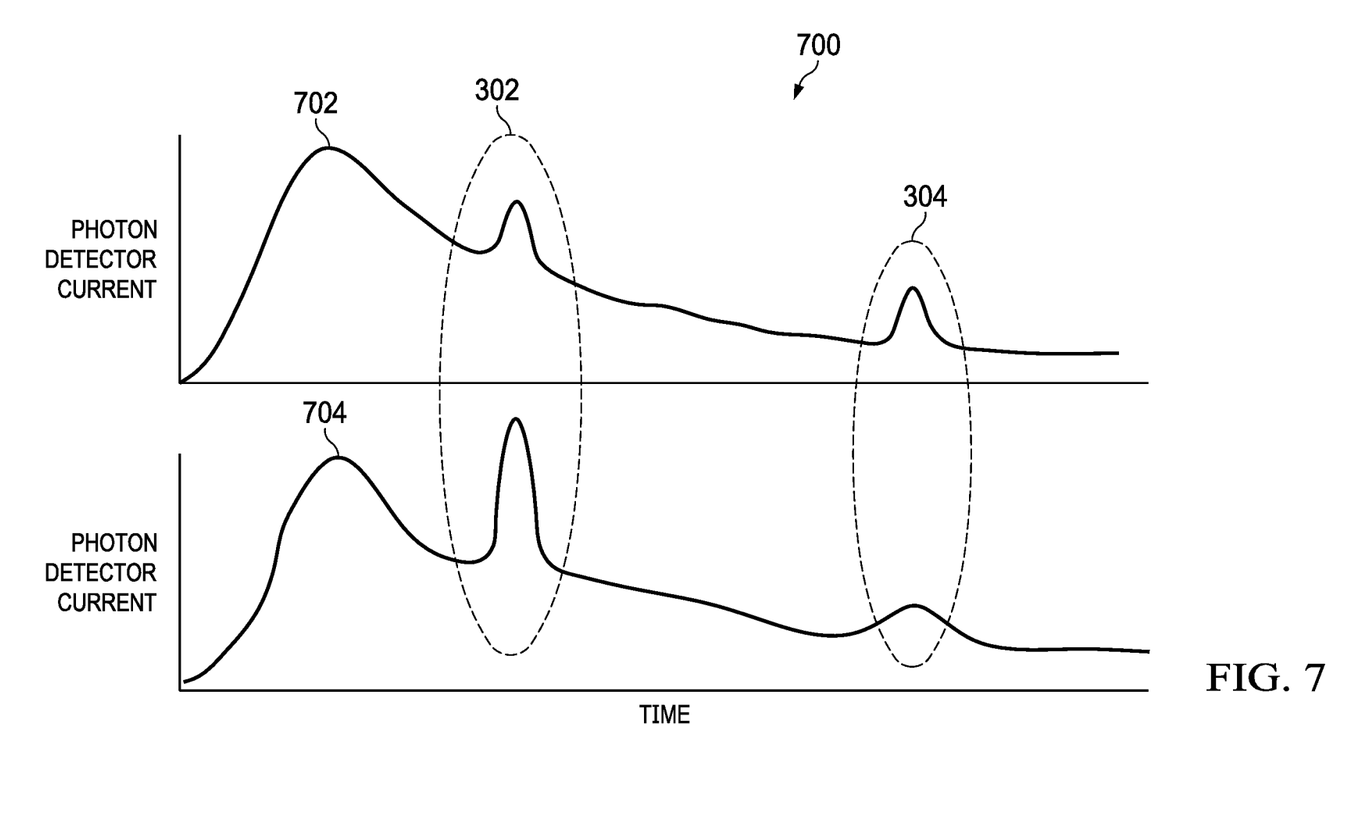
FIG. 7 shows an example graph of photon detector current against time, with an output signal for the first photon detector and an output signal for the second photon detector of the LIDAR system of FIG. 5.

FIG. 7 shows an example graph 700 of photon detector current against time, with an output signal 702 for the first photon detector 122 and an output signal 704 for the second photon detector 504 of the LIDAR system 500 of FIG. 5. As shown in FIG. 7, the first photon detector 122 output signal 702 shows a significant return from a real target 304 and a significant interfering signal 302 (a signal received from within the FOV 202 but outside the IFOV 204, which may result in a false positive). However, the difference between the activated-state contrast ratio and the deactivated-state contrast ratio results in the second photon detector 504 output signal 704 showing a larger peak for the interfering signal 124 and a smaller peak for the return from the real target 704 than the first photon detector 122 output signal 702. As described with respect to FIG. 5, this difference between the first and second photon detector 122, 504 output signals 702, 704 can be used to reject interfering signals 302 which can give rise to false positive object detection results in LIDAR systems.

Figure 8:
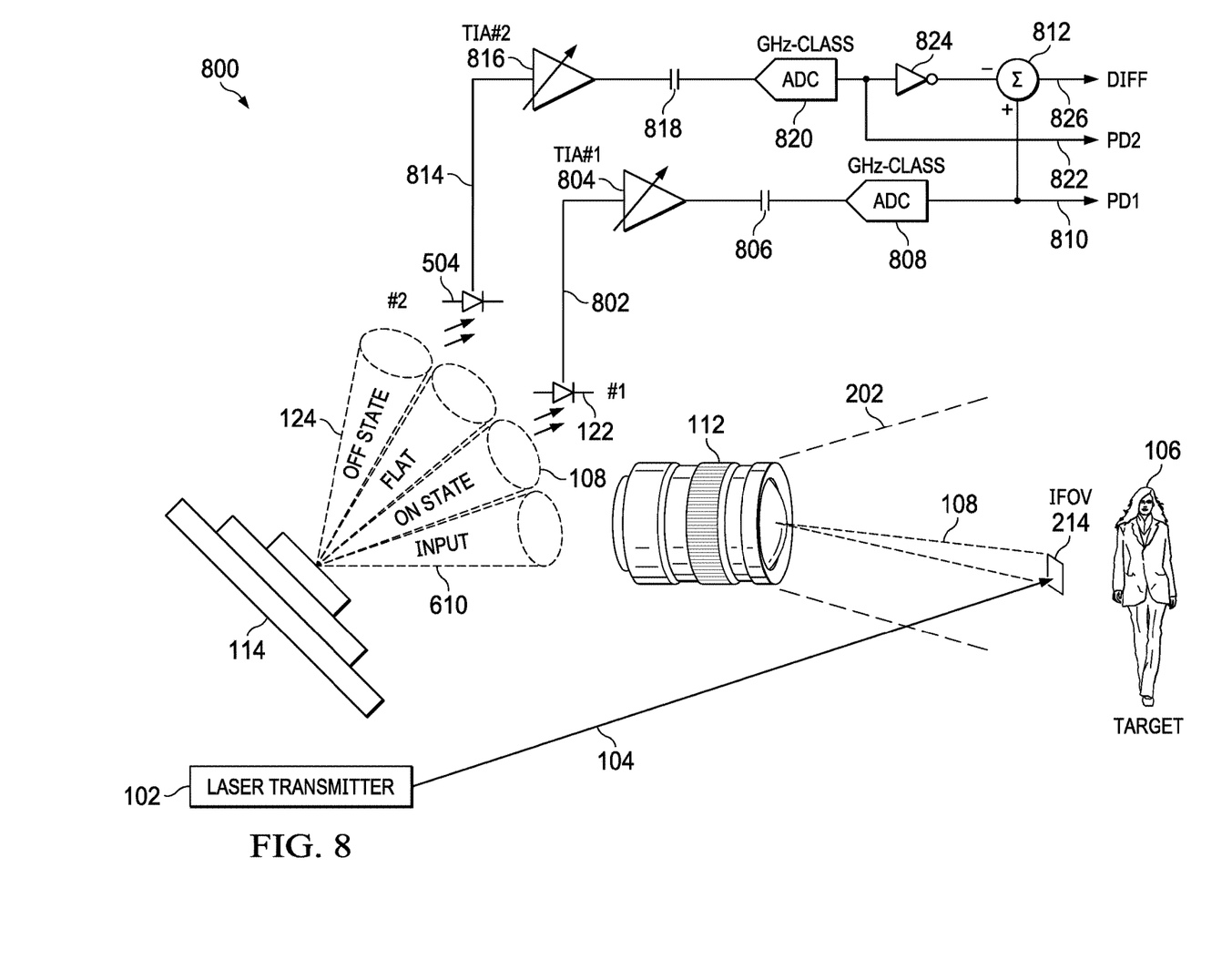
FIG. 8 shows an example of a LIDAR system for filtering interfering signals from a LIDAR return signal, using two photon detectors.

FIG. 8 shows an example of a LIDAR system 800 for filtering interfering signals 124 from a LIDAR return signal, using two photon detectors 122, 504. An output 802 of the first photon detector 122 is connected to an input of a first amplifier 804. An output of the first amplifier 804 is connected, via a first capacitor 806, to a (preferably GHz-class) first analog-to-digital converter 808 (ADC). An output of the first ADC 808 is connected to a first output line 810, and to a first input to an adder 812. An output 814 of the second photon detector 504 is connected to an input of a second amplifier 816. An output of the second amplifier 816 is connected, via a second capacitor 818, to a (preferably GHz-class) second ADC 820. An output of the second ADC 820 is connected to a second output line 822, and, via an inverter 824, to a second input to an adder 812. (The inverter 824 can be connected between the output of the first ADC 808 and the adder 812 instead.) An output of the adder 812 is connected to a differential output line 826. This provides an example embodiment implementing the normalization and photon detector output differential described with respect to FIG. 5.

Modifications are possible in the described embodiments, and other embodiments are possible, within the scope of the claims.

In some embodiments, an IFOV corresponds to multiple adjacent activated micromirrors.

In some embodiments, a photon detector includes multiple (or an array of) sensors, such as an array of photodiodes.

In some embodiments, multiple micromirrors are activated at the same time. In some embodiments, there are more deactivated micromirrors than activated micromirrors.

In some embodiments, timing and pulse shape correlation between return signals in the outputs of the first and second photon detectors, and the relative weakness of the return signal in the output of the second photon detector, can be used to add confidence that the return signal is a true return signal from within the IFOV.

In some embodiments, timing and pulse shape correlation between return signals in the outputs of the first and second photon detectors, and the relative strength of the return signal in the output of the second photon detector, can be used to add confidence that the return signal is an interference signal from within the FOV but outside the IFOV.

In some embodiments, the DMD is configured to sequentially activate micromirrors in the micromirror array in a pattern corresponding to a pattern with which the laser transmitter scans the field of view.

In some embodiments, a spatial light modulator other than a DMD can be used; for example, a liquid crystal on silicon device.

In some embodiments, the photon detector is a PIN photodiode, a silicon photomultiplier (SiPM), or an avalanche photodiode. In some embodiments, the photon detector used in the first photon detector is different from the photon detector used in the second photon detector. For example, different numbers of sensing elements can be used in different photon detectors; or the first photon detector can be a SiPM, and the second photon detector a PIN or avalanche photodiode.

In some embodiments, the output of the first photon detector is normalized to a contrast ratio of the second photon detector when analyzing the outputs. In some embodiments, the output of the second photon detector is normalized to a contrast ratio of the first photon detector when analyzing the outputs.

In some embodiments, light directing elements other than mirrors can be used to redirect light received by the receiver towards the first photon detector and the second photon detector. For example, other reflective surfaces or refractive elements (such as optical fibers or lenses) can be used. In some such embodiments, first and second (or more) states of the light directing surfaces (analogous to activated and deactivated states of micromirrors as described herein) are used to determine which photon detector receives FOV, IFOV or non-IFOV light. In some such embodiments, an array of light directing elements is configured to select whether a light directing element in the array is a first light directing element or a second light directing element in dependence on a location of the region of interest (such as the intersection between the laser beam and the target object). In some embodiments, there are more light directing elements in a state configured to receive non-IFOV light than there are light directing elements in a state configured to receive IFOV light.

In some embodiments, a third photon detector is used and located to receive light reflected from micromirrors in a "flat" state. In some embodiments, the first or second photon detector is located to receive light reflected from micromirrors in a "flat" state.

In some embodiments, an activated micromirror is in a first state (which can be an on state, an off state, or another state) and a deactivated micromirror is in a second state (which can be an on state, an off state, or another state).

In some embodiments, a number of activated is mirrors is used corresponding to an area (region) of the micromirror array large enough to receive (preferably, guarantee reception of) the (preferably, entire) laser spot (the scattered laser light received by the receiver lens system) plus an additional tolerance allowance (for example, for laser spot position ambiguity and for timing factors, such as if the laser is being pulsed more rapidly than mirrors in the micromirror array can be switched between activated and deactivated states to follow it). That is, preferably, the region of activated micromirrors is large enough (but not larger than necessary) to guarantee the entire laser spot is received and redirected towards the first photon detector, assuming proper selection of activated micromirrors within the micromirror array so that micromirrors which receive the scattered light are activated micromirrors.

What is claimed is:

1. A LIDAR system, comprising:
a first photon detector;
a second photon detector;
a spatial light modulator comprising at least one first light directing element and at least one second light directing element;
the at least one first light directing element configured to direct first received light from a region of interest of a field of view towards the first photon detector;
the at least one second light directing elements configured to direct second received light from the field of view towards the second photon detector;
the first photon detector configured to detect the first received light to produce first detected light;
the second photon detector configured to detect the second received light to produce second detected light; and
a subtractor coupled to the first photon detector and to the second photon detector, the subtractor configured to determine a difference between the first detected light and the second detected light.

2. The LIDAR system of claim 1,
wherein the at least one first light directing element and the at least one second light directing elements are arranged in an array; and
wherein the array is configured to select whether a light directing element in the array is of the at least one first light directing element or of the at least one second light directing element based on the region of interest.

3. The LIDAR system of claim 1, further comprising:
a first lens configured to focus, to the first photon detector, light directed by the at least one first light directing element; and
a second lens configured to focus, to the second photon detector, light directed by the at least one second light directing element.

4. The LIDAR system of claim 1, wherein the spatial light modulator is configured to isolate the first light directing element, the at least one second light directing elements, the first photon detector, and the second photon detector from light other than the field fo view.

5. The LIDAR system of claim 1, wherein the spatial light modulator is a digital micromirror device (DMD) or a liquid crystal on silicon device.

6. The LIDAR system of claim 1, further comprising:
a first amplifier coupled to an output of the first photon detector and to the subtractor; and
a second amplifier coupled to an output of the second photon detector and to the subtractor.

7. The LIDAR system of claim 1, wherein the at least one first light directing element is a first number of light directing elements; and
wherein the at least one second light directing elements is a second number of light directing elements, the second number of light directing elements greater than the first number of light directing elements.

8. The LIDAR system of claim 1, wherein the subtractor comprises:
an inverter; and
an adder coupled to the inverter.

9. The LIDAR system of claim 1, further comprising a laser transmitter configured to transmit a laser beam to the region of interest.

10. The LIDAR system of claim 1, further comprising:
a first analog-to-digital converter (ADC) coupled between the first photon detector and the subtractor; and
a second ADC coupled between the second photon detector and the subtractor.

11. A method comprising:
receiving, by a spatial light modulator, light from a field of view;
directing, by at least one first light directing element of the spatial light modulator, a first portion of the light towards a first photon detector, the first portion corresponding to a region of interest within the field of view;
directing, by at least one second light directing element of the spatial light modulator, a second portion of the light towards a second photon detector;
detecting, by the first photon detector, the first portion of light to produce first detected light;
detecting, by the second photon detector, the second portion of light to produce second detected light; and
comparing, by a subtractor, the first detected light and the second detected light.

12. The method of claim 11, further comprising determining locations of return signals using the second detected light.

13. The method of claim 11, further comprising normalizing the second detected light to a contrast ratio of the first photon detector, or normalizing the first detected light to a contrast ratio of the second photon detector.

14. The method of claim 11, further comprising correlating a timing or a pulse shape of the first detected light and the second detected light.

15. The method of claim 11, wherein the spatial light modulator is a digital micromirror device (DMD).

16. The method of claim 11, wherein the subtractor comprises:
an inverter; and
an adder coupled to the inverter.

17. A LIDAR system, comprising:
a laser transmitter configured to transmit a light beam to a region of interest in a field of view;
a first photon detector;
a second photon detector;
a spatial light modulator comprising at least one first light directing element and at least one second light directing element;
the at least one first light directing element configured to direct first received light from the region of interest of the field of view towards the first photon detector;
the at least one second light directing elements configured to direct second received light from the field of view towards a second photon detector;
the first photon detector configured to detect the first received light to produce first detected light;
the second photon detector configured to detect the second received light to produce second detected light; and
a subtractor coupled to the first photon detector and to the second photon detector, the subtractor configured to determine a difference between the first detected light and the second detected light.

18. The LIDAR system of claim 17, wherein the subtractor comprises:
an inverter; and
an adder coupled to the inverter.

19. The LIDAR system of claim 17, further comprising:
a first amplifier coupled to an output of the first photon detector and to the subtractor; and
a second amplifier coupled to an output of the second photon detector and to the subtractor.

* * * * *